March 18, 1941.    M. H. SAVAGE ET AL    2,235,536
ELECTRICAL CABLE
Filed June 8, 1938
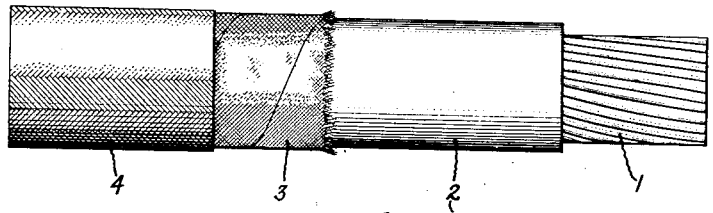
OZONE-RESISTANT COMPOSITION
COMPRISING RUBBER, POLYMERIZED
ISO-OLEFINE AND FACTICE
Inventors:
Manuel H. Savage,
Lyman H. Hitchcock,
by Harry E. Dunham
Their Attorney.

Patented Mar. 18, 1941

2,235,536

UNITED STATES PATENT OFFICE 2,235,536

ELECTRICAL CABLE

Manuel H. Savage, Bridgeport, and Lyman H. Hitchcock, Milford, Conn., assignors to General Electric Company, a corporation of New York Application June 8, 1938, Serial No. 212,478

4 Claims. (Cl. 174—121)

The present invention relates to electrical cables. It is concerned more particularly with insulated electrical cables having as insulation a novel ozone- and corona-resistant insulating composition. The cables of this invention are especially adapted for use in high voltage circuits.

Ordinary rubber insulating cables, if used in high voltage circuits, fail in a comparatively short time due to the deterioration and destruction of the insulation. This is primarily because ozone, produced by reason of corona discharge in high voltage circuits, violently attacks and destroys conventional rubber insulation. Hence it has been a decided problem to obtain a properly insulated cable in which the insulation will have the requisite dielectric strength and flexibility and, at the same time, be resistant to ozone.

We have discovered a rubber composition which, in a vulcanized state, is flexible and highly resistant to ozone, has a high dielectric strength, good heat and moisture resistance, and provides an insulated electrical cable which meets all other requirements of cables to be used in high voltage circuits.

The novel features which are characteristic of our invention are set forth in the appended claims. The invention itself, however, will best be understood from the following detailed description thereof and the accompanying drawing forming a part of this application.

In the drawing the single figure is an elevational view of a portion of a cable constructed in accordance with the invention.

As illustrating our invention, the cable shown in the drawing is of the single-conductor type and is a flexible cable which may be used, for example, in connection with neon gas signs and in other applications where high voltage circuits are employed. In such cases the insulation must have a high dielectric strength, since the operating voltages may range from 5 to 15 k. v. and, at times, to 25 k. v. or more. The cable also must be so constructed that the insulation is resistant to attack by ozone resulting from corona discharge. The cable of this invention meets these requirements.

The cable illustrated comprises a single conductor 1, which is preferably tinned copper and stranded. This conductor is insulated with a covering 2 of the new ozone-resistant composition which will be described more fully hereafter. Over this covering preferably is applied one or more spirally wound layers of a suitable tape 3 as, for example, a fabric material such as cotton, silk, etc., coated and impregnated with rubber or the like. Over the tape 3, which may be, for instance 10 to 15 mils thick, is applied a braid 4 of soft cotton yarn or the like. This braid is impregnated with standard flame-proofing and weather-proofing compounds.

We have discovered that by incorporating into a rubber composition certain linear polymers of high molecular weight, we are able to provide a high dielectric strength insulating material which possesses remarkable resistance to ozone. The polymers in question are produced, for instance, by polymerizing such unsaturated hydrocarbons as iso-olefines, for example, iso-butylene, iso-amylene, etc. Polymerization is conducted at a temperature below −10 degrees C. with inorganic halide catalyst such as boron fluoride, boron fluoride charged with hydrofluoric acid, aluminum chloride, stannic chloride, titanium chloride, phosphorous tri-fluoride, phosphorous penta-fluoride, tin or aluminum foil treated with hydrogen chloride, etc. Polymerized compounds of this general type are known under the trade name of "Vistanex" and are produced and sold by the Standard Oil Development Company. Methods of manufacturing such compounds are described more fully in, for example, U. S. Patent No. 2,084,501, Otto and Mueller-Cunradi.

The above linear polymers vary in physical characteristics from viscous oils, through plastic masses of varying consistencies, to hard, horn-like solids. They are commonly produced in molecular weights ranging from 800 to 300,000 or higher. The molecular weight values herein mentioned are as determined by the viscosity method described by H. Staudinger in his book, "Die Hochmolekularen Organischem Verbindungen," published in 1932 (Berlin). The polymers used in making the ozone-resistant compositions of this invention are oil-soluble, plastic masses. Generally speaking, the polymers comprising such masses have a molecular weight ranging, for example, from 5,000 or 10,000 up to 50,000 or 100,000, or more. We prefer to use a polymer of the kind above described which has a molecular weight in excess of about 30,000 or 40,000, since the lower molecular weight polymers have a considerable softening effect upon the rubber composition. Polymers with a molecular weight up to, say, about 300,000 may be used, but in general polymers with a molecular weight materially above about 200,000 are less desirable since it is more difficult to disperse such polymers uniformly in the composition.

In order to prepare the ozone-resistant compound used in connection with the manufacture of the cable, the following procedure is employed:

A special factice is first prepared by mixing a semi-drying oil such as rapeseed oil, castor oil or the like: a mineral rubber or asphaltic material as, for instance, gilsonite; a high melting-point waxy substance such, for example, as ozokerite; and a vulcanizing agent such as sulfur, together with litharge or an accelerator having similar properties. The mixed ingredients are heated gradually to form a viscous liquid mass, the final temperature being of the order of 300° to 350° F. While the proportions of ingredients used may vary, we prefer to use a mixture of approximately the following composition:

|  | Parts by weight |
|---|---|
| Rapeseed | 40 |
| Gilsonite | 40 |
| Ozokerite | 10 |
| Sulfur | 8 |
| Litharge | 2 |

During the heating period the sulfur combines with other components of the mix, particularly with the rapeseed oil. The melting point and penetration of the end-product are controlled by the heating period, which may vary, for example, from 2 to 8 hours. We prefer to use a product which is formed by heating the above mixture over a period of about 6 hours at 300° F. The factice formed as described from the above components sets to a rubber-like material. In this state it is ready for combination with the other ingredients used in preparing the ozone-resistant compound.

The above factice is combined, following standard rubber compounding practice, with suitable proportions of crude or synthetic rubber or mixtures thereof, the above-described polymer (designated, for brevity, in the following formulas as "polymer"), sulfur, and "filler," within which term is included strengthening or reinforcing agents such, for example, as clay, zinc oxide, etc., as well as the usual accelerators, anti-oxidants and softening agents. The constituents employed in the preparation of the ozone-resistant compound may be varied within the approximate limits, as follows:

|  | Per cent by weight |
|---|---|
| Polymer } In the ratio by weight of 1 part polymer to 1 to 2 parts Rubber } rubber | 20 to 35 |
| Factice | 40 to 65 |
| Filler | Up to 25 |
| Sulfur | Up to 3 |

More specific examples of formulas for making the ozone-resistant compound follow:

Example 1

|  | Parts by weight |
|---|---|
| Smoked sheet (natural) rubber | 15.0 |
| Polymer | 10.0 |
| Factice | 52.5 |
| Zinc oxide | 15.0 |
| Litharge | 3.0 |
| Anti-oxidant ("Neozone D") | 0.5 |
| Magnesia | 1.0 |
| Sulfur | 1.0 |
| Paraffin wax | 2.0 |

The ozone resistance of the resulting vulcanized compound was tested by exposing 1"x⅛" pieces, stretched 100%, to a concentration of ozone of 0.03%. The above compound showed no surface cracks after exposure for 9 hours, at which point the test was discontinued. A duplication of the above compound, but containing no polymer, showed surface cracking after 1½ minutes' exposure. A rubber compound heretofore widely used in making cable for high voltage applications, when similarly tested, showed surface cracking after 2 minutes' exposure to the ozone atmosphere.

Example 2

|  | Parts by weight |
|---|---|
| Smoked sheet (natural) rubber | 19.0 |
| Synthetic rubber (polymerized chloro-2-butadiene-1,3) | 3.0 |
| Factice | 47.0 |
| Zinc oxide | 12.0 |
| Polymer | 13.0 |
| Litharge | 3.0 |
| Anti-oxidant ("Neozone D") | 0.5 |
| Magnesia | 0.5 |
| Sulfur | 1.0 |
| Paraffin wax | 1.0 |

A sample length of cable insulated with the above vulcanized compound was bent, without twisting, 360° around a mandrel, the diameter of which was 3.95 times the outside diameter of the cable with all outer coverings removed. The thus wound cable was then exposed to a concentration of ozone of 0.03%. The insulation showed no surface cracking after 36 hours' exposure to the ozone. Under similar conditions materials now being used in cables for high voltage applications cracked badly within from 3 to 180 minutes.

The vulcanized compound of this invention has a dielectric strength ranging, for example, from 350 or 450 volts per mil up to 700 or 800 volts per mil. A conductor provided with a 19/64 inch wall of the compound showed an insulation resistance of about 5400 megohms per 1000 feet. After soaking for 12 hours in water, it withstood a voltage of 40 k.v. for 5 minutes, breaking down upon the application of 62 k.v.

The ozone-resistant insulation may be tubed on a metallic conductor by means of conventional rubber tubing apparatus. It is vulcanized in the usual manner in direct steam vulcanizers. The curing time and temperatures may be, for example, as follows:

A gradual warming to about 260° F. for approximately one-half hour.

A cure at about 260° F. for approximately one hour.

Another rise from about 260° to 275° F. for approximately fifteen minutes.

A cure at about 275° F. for approximately forty-five minutes.

By gradually increasing the curing temperatures as above described first to 260° F. and, later, to 275° F. a dense, nonporous insulating wall is obtained.

After vulcanization, a layer of suitable tape and an outer covering of fibrous material such as cotton braid are applied. This braid is impregnated with standard flame-proofing compounds and weather-proofing compounds in a manner well-known in the art. The tape reinforces the cable and also serves to protect the ozone-resistant composition from the braid-impregnating compounds.

Instead of tubing the ozone-resistant insulation on the conductor, such insulation may be made in the form of a sheet or tape and a plurality of layers of the same may be applied in tandem to the conductor by means of a strip-covering machine.

Preferably the ozone-resistant material is superposed directly on the conductor as shown in the drawing, but under certain conditions it may be desirable to apply a conventional rubber or other high grade insulating covering directly to the conductor, followed by one or more layers of the ozone-resistant composition, with or without intervening layers of fibrous or other insulating material. In this way, a composite insulation of improved mechanical strength, lower specific inductive capacitance, and better insulation resistance is obtained. When the ozone-resistant material is applied directly on the conductor, it will be understood of course that other insulating materials may be superposed thereupon, followed, if desired, by one or more additional layers of the ozone-resisting composition.

The cable of this invention is simple and economical to manufacture, and combines the properties of high dielectric strength, flexibility and ozone-resistance in and to a degree heretofore not found in cables for high-voltage applications. Due to the outstanding ozone-resistance of the new insulation, a cable of long service life is obtained.

What we claim as new and desire to secure by Letters Patent of the United States is:

1. An electrical cable comprising an electrical conductor with insulation thereon comprising the vulcanized product of

|  | Per cent by weight |
|---|---|
| Rubber and polymer | 20 to 35 |
| Factice | 40 to 65 |
| Filler | Up to 25 |
| Sulfur | Up to 3 | said polymer being a high molecular weight linear polymer of an iso-olefine and the said rubber and polymer being associated in the ratio of, by weight, 1 part polymer to 1 to 2 parts rubber.

2. An electrical cable for use in high voltage circuits, said cable comprising an electrical conductor, an outer covering of treated fibrous material, and a high dielectric strength, ozone-resistant insulating composition superposed directly on the said conductor, said insulation being the vulcanized product of

|  | Per cent by weight |
|---|---|
| Rubber and polymer | 20 to 35 |
| Factice | 40 to 65 |
| Filler | Up to 25 |
| Sulfur | Up to 3 | said polymer being a high molecular weight linear polymer of iso-butylene and the said rubber and polymer being associated in the ratio of, by weight, 1 part polymer to 1 to 2 parts rubber.

3. A high dielectric strength ozone-resistant insulating composition which is the vulcanized product of

|  | Per cent by weight |
|---|---|
| Rubber and polymer | 20 to 35 |
| Factice | 40 to 65 |
| Filler | Up to 25 |
| Sulfur | Up to 3 | said polymer being a high molecular weight linear polymer of an iso-olefine and the said rubber and polymer being associated in the ratio of, by weight, 1 part polymer to 1 to 2 parts rubber.

4. A high dielectric strength ozone-resistant insulating composition which is the vulcanized product of

|  | Per cent by weight |
|---|---|
| Rubber and polymer | 20 to 35 |
| Factice | 40 to 65 |
| Filler | Up to 25 |
| Sulfur | Up to 3 | said polymer being a high molecular weight linear polymer of iso-butylene and the said rubber and polymer being associated in the ratio of 1 part polymer to 1 to 2 parts rubber.

MANUEL H. SAVAGE.
LYMAN H. HITCHCOCK.